United States Patent [19]

Kozuki et al.

[11] Patent Number: 4,803,684
[45] Date of Patent: Feb. 7, 1989

[54] APPARATUS FOR DATA ERROR CORRECTION USING ROUNDING TECHNIQUE

[75] Inventors: Susumu Kozuki, Tokyo; Masahiro Takei, Kanagawa; Toshiyuki Masui, Kanagawa; Masahide Hirasawa, Kanagawa; Motokazu Kashida, Tokyo, all of Japan

[73] Assignee: Canon Kabushiki Kaisha, Tokyo, Japan

[21] Appl. No.: 697,399

[22] Filed: Feb. 1, 1985

[30] Foreign Application Priority Data

| Feb. 7, 1984 | [JP] | Japan | 59-20517 |
| Feb. 8, 1984 | [JP] | Japan | 59-21087 |
| Feb. 8, 1984 | [JP] | Japan | 59-21088 |
| Feb. 22, 1984 | [JP] | Japan | 59-31685 |

[51] Int. Cl.$^4$ .......................................... G06F 15/353
[52] U.S. Cl. .................................................. 371/31
[58] Field of Search ........................ 371/31; 364/200 MS File, 900 MS File, 745

[56] References Cited

U.S. PATENT DOCUMENTS

| 4,054,863 | 10/1977 | Goodman et al. | 371/31 |
| 4,223,389 | 9/1980 | Amada et al. | 364/724 |
| 4,305,133 | 12/1981 | Amada et al. | 364/724 |
| 4,337,518 | 6/1982 | Ohnishi et al. | 364/724 |
| 4,430,736 | 2/1984 | Scholz | 371/31 |
| 4,451,921 | 5/1984 | Odaka | 371/31 |

Primary Examiner—Eddie P. Chan
Assistant Examiner—Jonathan C. Fairbanks
Attorney, Agent, or Firm—Toren, McGeady & Associates

[57] ABSTRACT

A data processing device for processing a data sequence obtained by sampling an information signal, is arranged to compute a plurality of data before and/or after an incorrect data amoung the data sequence, to have data obtained by rounding up or rounding off the results of computation at about the same rate, and to replace the incorrect data with the computed data.

11 Claims, 14 Drawing Sheets

F I G.10
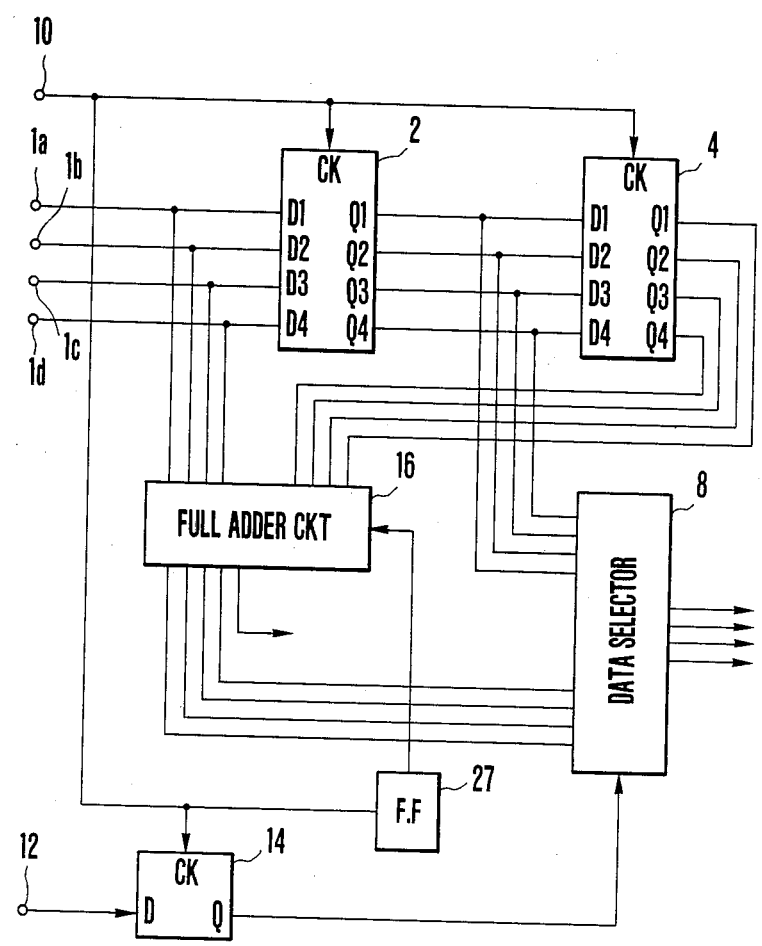

APPARATUS FOR DATA ERROR CORRECTION USING ROUNDING TECHNIQUE

BACKGROUND OF THE INVENTION

1. Field of the Invention

This invention relates to a data processing device and more particularly to a data processing device for processing a data sequence obtained by sampling an information signal.

2. Description of the Prior Art

A data sequence consisting of data arranged in the direction of time, is obtained when an information signal, such as an audio or video signal, is sampled. Such a data sequence is generally transmitted in serial order. However, incorrect data sometimes arise among the data obtained via a transmission system. In that event, there have been employed methods, called interpolation methods, in which the incorrect data are replaced with presumed data, called interpolation data, which are obtained from correct data before and/or after the incorrect data.

For example, known interpolation methods for replacing incorrect data arising within a data sequence obtained by sampling an audio signal, include a pre-holding method in which a data immediately before an incorrect rate data, is used as it is for interpolation; an average value interpolation method, in which a data obtained by averaging data immediately before and after an incorrect rate data, is used for interpolation; and a tertiary interploation method in which a data obtained from at least four data near an incorrect rate data is used for interpolation.

The accuracy or proximity of the interpolation data to a proper data is the lowest in accordance with the pre-holding method, better in the average value interpolation method and best in the tertiary interpolation method. However, the scale of hardware required increases with the accuracy attainable. These methods are thus employed according to the kind of the information signal to be processed and to the scale allowable for the equipment to be used.

FIG. 1 of the accompanying drawings schematically shows an arrangement of a typical conventional data processing device which uses the average value interpolation method in replacing incorrect data. Referring to FIG. 1, each of latching circuits 2 and 4 is arranged to delay a data supplied thereto by one sampling period. An average value computing circuit 6 is arranged to produce, through computation, a data of an average value obtained from a data supplied to the latching circuit 2 and a data produced from the latching circuit 4. A data selector 8 is arranged to select either the data produced from the latching circuit 2 or the data produced from the average value computing circuit 6. An input terminal 10 is arranged to receive timing clock pulses. Another input terminal 12 is arranged to receive a known error detection signal which indicates an incorrect or a correct data. Another latching circuit 14 is arranged to delay, by one sampling period, the error detection signal. As is well known, the error detection signal is obtained by checking a parity word or CRCC. For example, in the case that the data supplied to the latching circuit 2 is incorrect, an input "1" is supplied to the terminal 12 and, if the data is correct, an input "0" is supplied to the terminal 12. The data selector 8 produces the output data of the average value computing circuit 6 when the output of the latching circuit 14 is at "1" and produces the output data of the latching circuit 2 when the output of the latching circuit 14 is at "0".

If the data produced from the latching circuit 2 is correct, the output of the latching circuit 14 is at "0" and the data selector 8 selects the output data of the latching circuit 2 as it is. In the event that the data produced from the latching circuit 2 is incorrect, the output of the latching circuit 14 becomes "1". Then, the output data of the average value computing circuit 6 is selected by the data selector 8. Since the output data of the average value computing circuit 6 is a data of the average value of data immediately before and immediately after the output data of the latching circuit 2, the data processing device thus performs average value interpolation.

The above-stated average value computing circuit 6 consists of, for example, a full adder and a ½ multiplier operating by one bit shift. In this instance, if the least significant bit of the data supplied to the ½ multiplier is "1", the data produced from the average value computing circuit 6 is inevitably obtained by rounding off the result of computation. This will be further described below:

Assuming that each data consists of four bits, a data A which is immediately before an incorrect data B is 1101 (2) and a data C which is immediately after the incorrect data B is 1101 (2), in computing (A+C)/2 by the above-stated method, A+C becomes 10110 (2). With the value down shifted by one bit, it becomes 11011 (2). According to the decimal system, it becomes (13+9)/2=11. Therefore, a proper average value of the data can be obtained in this instance. In another instance, however, if the data A is 1101 (2) and that data C is 1000 (2), for example, 10101 (2) is obtained by computing A+C and then 1010 (2) is obtained as the average value data. Then, in the decimal system, this is expressed as (13+8)/2=10, which is not a proper average value as the fractional portion of the result of computation is lost. Accordingly, in the event of many incorrect data, the average value interpolating data processing device inevitably shifts a proper information signal downward before it is produced.

In other conventional data processing devices which are arranged differently from the above-stated one, the values of the interpolating data are also either rounded up or rounded off when they are computed. Therefore, their outputs have been also shifted from a proper information signal. Besides, in cases where positive and negative portions of a signal are produced at about the same rate with reference to a zero level, like in the case of an analog audio signal, this shift results in an undesirable DC component.

Further, it is impossible to determine whether a proper information signal is larger or smaller than an average value data. Therefore, the down shifted or rounded off output data might increase an error from an original analog signal. This also has sometimes resulted in an unnatural high frequency component. The conventional arrangement to round up the fraction instead of rounding it off also has presented these problems.

SUMMARY OF THE INVENTION

It is an object of this invention to provide a data processing device which is capable of solving the above-stated problems presented by the prior art.

It is another object of this invention to provide a data processing device wherein an information signal is never shifted downward nor upward by interpolating replacement of data.

It is a further object of this invention to provide a data processing device which is capable of producing data to give an information signal of a characteristic close to a proper information signal.

To attain these objects, a data processing device which is arranged in accordance with this invention to process a data sequence obtained by sampling an information signal comprises: Computing means for computing a plurality of data located before and/or after an incorrect data within the data sequence; control means for controlling the output data of the computing means in such a manner that the results of computation by the computing means are rounded up and rounded off at about the same rate; and replacing means for replacing the incorrect data with the output data of the computing means.

These and further objects and features of this invention will become apparent from the following detailed description of embodiments thereof taken in connection with the accompanying drawings.

BRIEF DESCRIPTION OF THE DRAWINGS

FIG. 10 is a block diagram showing the arrangement of essential parts of a data processing device arranged as a further embodiment of the invention.

DETAILED DESCRIPTION OF THE PREFERRED EMBODIMENTS

The following describes various examples of embodiments of this invention with reference to the accompanying drawings and on the assumption that each of these embodiments are arranged to receive an analog information signal in the form of a digital data quantized in four bits. Generally, a two's complement method is applied to the binary scale used in binary coding for an audio or video signal. This method is used because a value corresponding to a data which tends to have all bits thereof become "0" or "1" in the event of abnormality of a system, is close to 0. However, each of the embodiment given below uses a computing circuit which includes the above-stated 1/2 multiplier operating by one bit shift. Therefore, each of the embodiments described below is assumed to process data binary coded by the method called the offset binary method. The embodiments also may be considered to be arranged to process data obtained by converting the data obtained through a 2's complement process, into a data processed by the offset binary method.

Figure 1:
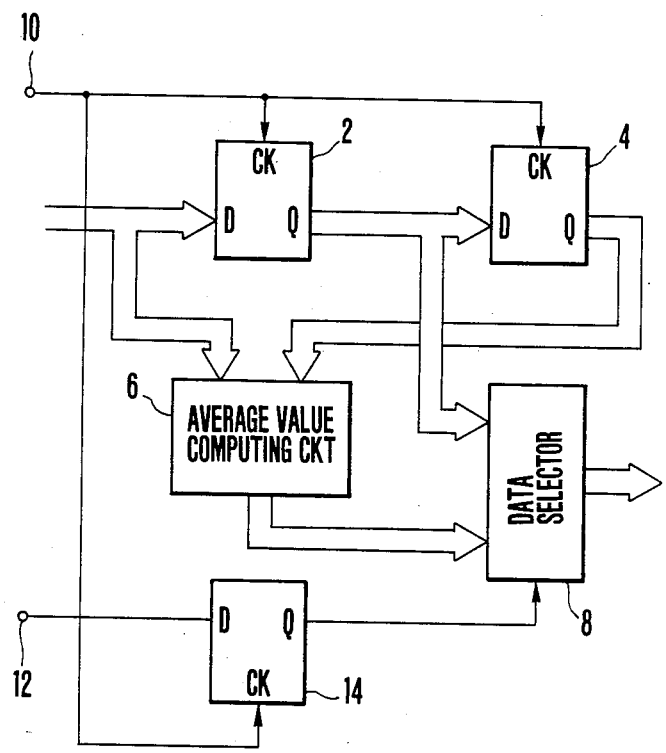
FIG. 1 is a block diagram of a typical conventional data processing device.
Figure 2:
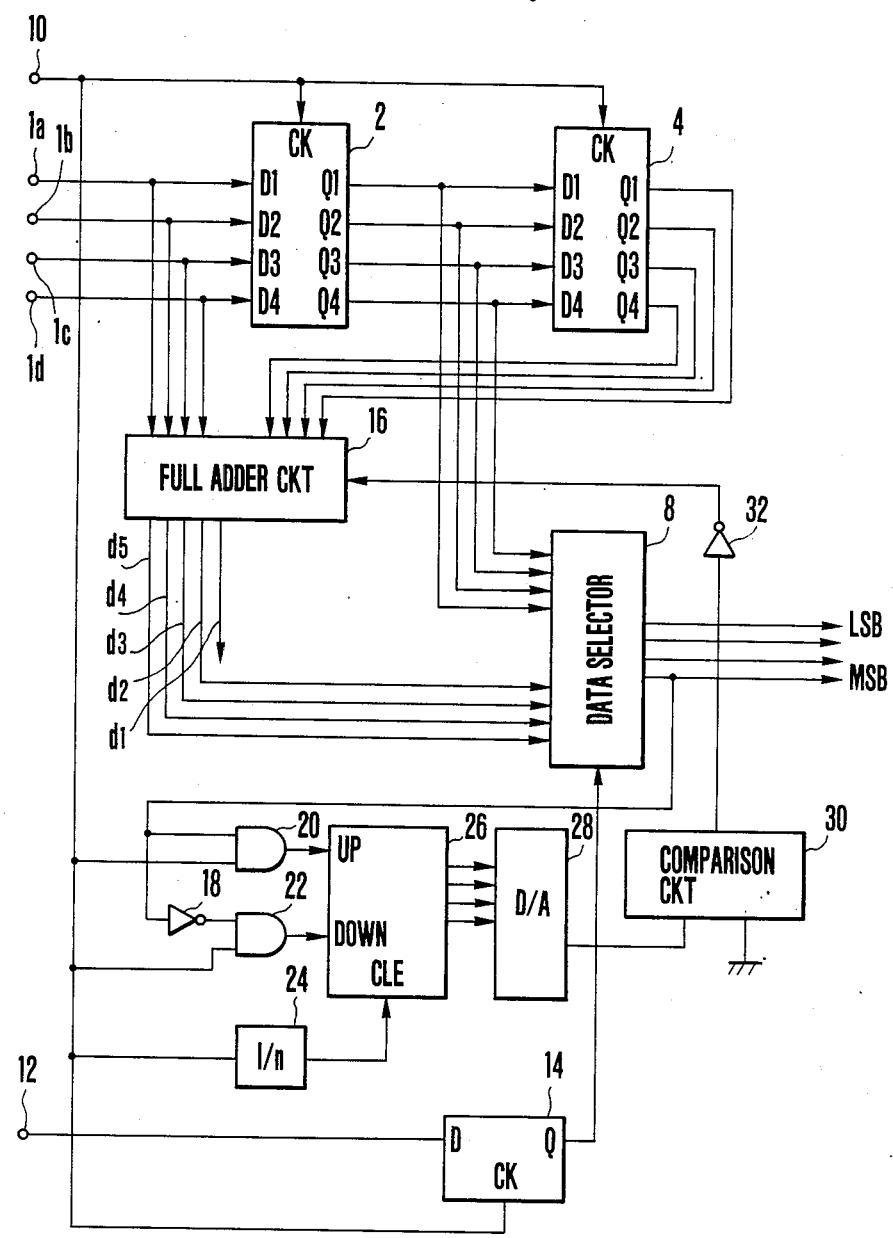
FIG. 2 is a block diagram showing the arrangement of essential parts of a data processing device arranged according to this invention as an embodiment thereof.

FIG. 2 shows the arrangement of the essential parts of a data processing device embodying this invention as an embodiment thereof. In FIG. 2, the elements which are similar to those shown in FIG. 1 are indicated by the same reference numerals and are omitted from the following description: The embodiment includes input terminals 1a, 1b, 1c and 1d which are arranged to receive binary data, respectively. The data comes via a transmission system in the form of a four-bit data. A full adder circuit 16 performs an adding operation on the four-bit data supplied from the terminals 1a-1d and a four-bit data produced from the latching circuit 4 and produces the result of the adding operation as a five-bit data consisting of bits d1-d5. If the four bits d2-d5 of the five-bit data are produced excluding the least significant bit d1, a data is obtained by rounding off or discarding the fraction of an average value of the input data of the latching circuit 2 and the output data of the latching circuit 4 as has been described in the foregoing. The embodiment is provided with an inverter 18; AND gates 20 and 22; a frequency divider 24, which is arranged to frequency divide timing clock pulses into 1/n; an up-down counter 26 which is arranged to count the outputs of the AND gates 20 and 22; a digital-to-analog converter 28 (hereinafter referred to as the D/A converter); a comparison circuit 30; and an inverter 32 which is arranged to have its output carried into the full adder circuit 16.

Using a specific input data, by way of example, the operation of each part of the embodiment arranged as described above, is as follows: In this specific embodiment, the input data is obtained by sampling an analog signal (for example, an audio signal), which includes positive and negative levels at about the same rate relative to a 0 level. As a quantization, the signal is linearly quantized in four bits stepwise arranged in 16 steps from −8 to +7. In other words, if the signal includes a decimal data of −8, the data is 0000 (2). If it is +7, it becomes 111 (2).

The embodiment is arranged to show whether the most significant bit data in the output of the data selector 8 is large than 0 or smaller than 0 as considered in the decimal system. This most significant bit data (hereinafter referred to as MSB) is supplied to the AND gate 20 and via the inverter 18 to the AND gate 22. Other input terminals of the AND gates 20 and 22 receive timing clock pulses. The AND gate 20 produces a pulse when the output data is larger than 0 and the AND gate 22 a pulse when the output data is smaller than 0. The up-down counter 26 up counts when the output data is larger than 0 (above 1000 (2)) and down counts when it is less than 0 (below 0111 (2)). The clear input terminal of the up-down counter 26 receives a signal which is obtained by frequency dividing the timing pulses into 1/n by the frequency divider 24. By this signal, the up-down counter 26 is periodically cleared.

The output of the up-down counter 26 is converted into an analog value by the D/A converter 28. The analog value output of the converter 28 is supplied to a level comparator 30 and is compared with a 0 level when an incorrect data is supplied from the latching circuit 2 to the data selector 8. If, at that time, the output of the D/A converter 28 is found positive, the output of the comparator 30 becomes "1" and the output of the inverter 32 becomes "0". Then, the carry-in to the full adder circuit 16 also becomes "0". If the output of the D/A converter 28 is found negative, the carry-in to the full adder circuit 16 becomes "1".

Figure 3:
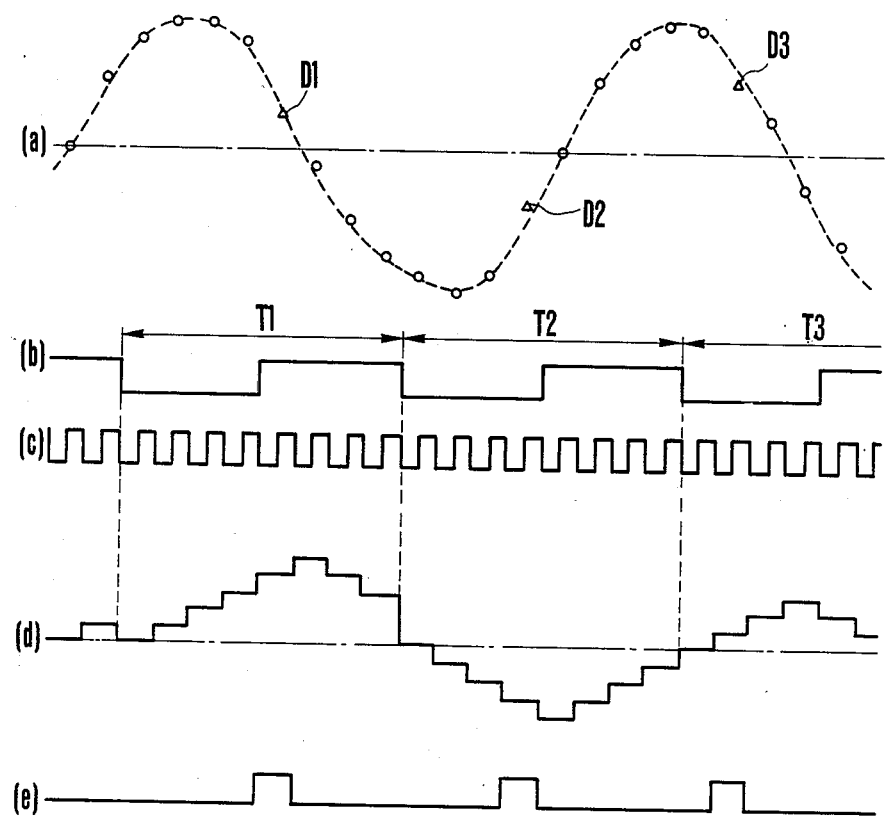
FIG. 3 is a timing chart showing the waveforms of outputs produced from the various parts of the embodiment shown in FIG. 2.

FIG. 3 is a timing chart showing the operation of the device shown in FIG. 2. Referring to FIG. 3, the operation of the device of FIG. 2 is further described with a specific input data taken up by way of example: A part (a) of FIG. 3 shows an original analog signal in a broken line. Marks "o" indicate low error rate data and marks "Δ" indicate interpolation data. A part (b) shows the output of the frequency divider 24; a part (c) timing clock pulses; a part (d) the output of the D/A converter 28; and a part (e) the output of the latching circuit 14.

When an interpolation data D1 is obtained as shown in the drawing, the level of the output of the D/A converter 28 is higher than the 0 level. This indicates that, within a period T1 designated by the frequency divider 24, a group of data produced prior to the data D1 include data of levels higher than the 0 level in a greater number than data of levels lower than the 0 level. In this case, the output of the comparator 30 is at "1" and that of the inverter 32 at "0". Therefore, the carry-in of the full adder circuit 16 becomes "0". Therefore, assuming that a data produced immediately before the data D1 is 1110 (2) or +6 and a data immediately after the data D1 is 0111 (2) or −1, the output of the full adder circuit 16 becomes 10101 (2). As a result of this, the device produces a data which is 1010 (2) or +2 and the fraction (the least significant bit of the output of the full adder circuit 16) is discarded.

Next, when another interpolation data D2 is obtained, the output of the D/A converter 28 is lower than the 0 level. This indicates that, within another period T2 designated by the frequency divider 24, a group of data produced prior to the interpolation data D2 include data of levels lower than the 0 level in a greater number than data of levels higher than the 0 level. In that case, the output of the comparator 30 becomes "0" and that of the inverter 32 "1". Accordingly, the carry-in of the full adder circuit 16 becomes "1". Assuming that the data immediately before the interpolation data D2 is 0001 (2) or −7 while the data immediately after the data D2 is 1000 (2) or +0, the output of the full adder circuit 16 becomes 01010 (2) with the carry-in added to the value 01001 (2). Then a data produced from the device as a result of this becomes 0101 (2) or −3 showing that fractional component is thus raised or rounded up. Another interpolation data D3 also results in a similar change.

In accordance with the arrangement as described above, several data produced immediately before the interpolation data are determined as to whether they are tending to be higher than the 0 level or to be lower than the 0 level. Then, the fraction of the output of the device is discarded when they are higher and is raised when they are lower. Accordingly, the output data sequence is thus brought closer to the 0 level and is never shifted in one direction by the interpolation, so that a data sequence of a characteristic close to a proper information signal can be obtained.

It is of course possible to have the fraction raised instead of being discarded when the output level of the D/A converter 28 is higher than the 0 level and discarded instead of raised when it is lower than the 0 level. In this instance, the absolute value of the output data somewhat increases with reference to the 0 level. However, such a modification also gives the same advantageous effect of keeping the signal unchanged. This modification can be arranged with the output of the comparator 30 arranged to be carried directly into the full adder circuit 16 without going through the inverter 32.

Figure 4:
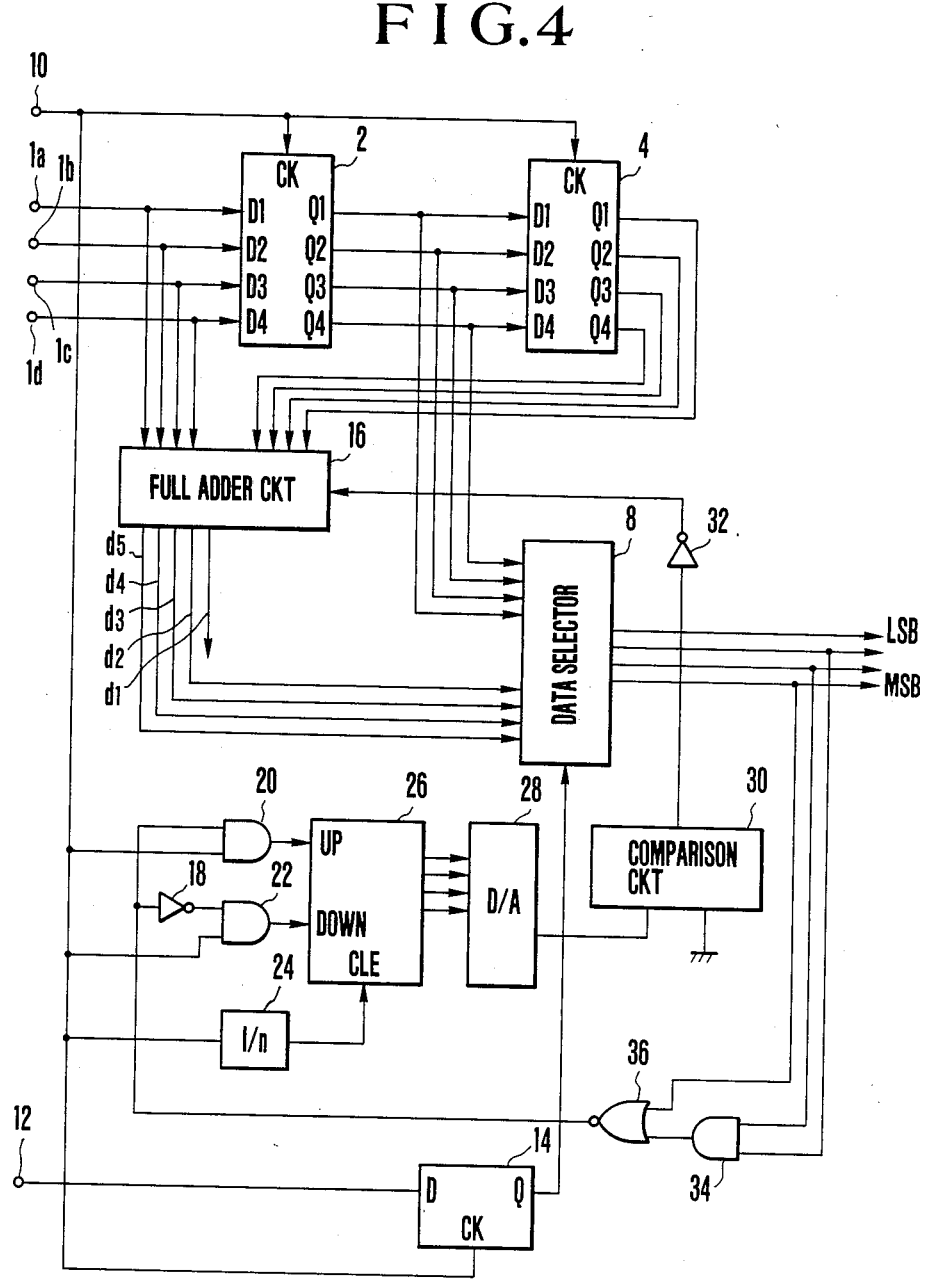
FIG. 4 is a block diagram showing the arrangement of essential parts of a data processing device arranged according to this invention as another embodiment thereof.

FIG. 4 shows the essential parts of a data processing circuit embodying this invention as another embodiment thereof. In FIG. 4, the same component elements as those shown in FIG. 2 are indicated by the same refernce numerals and details of them are omitted from description here. The embodiment includes an AND gate 34 and a NOR gate 36. The embodiment is arranged such that the up-down counter 26 up counts when the output of the data selector 8 is above 0100 (2) and down counts when it is below 0101 (2). Accordingly, the output of the inverter 32, or the carry-in of the full adder circuit 16 becomes "0" in the case where several data immediately before the interpolation data includes data of values larger than 0110 (2) or −2 in a greater number than data of values smaller than 0110 (2) or −2 and becomes "1" when the former data are fewer than the latter in number. Since the levels of data are thus judged with reference to −2, the embodiment is applicable to a processing operation on data obtained by sampling an analog signal which has portions thereof at about the same rate on both sides of −2. The embodiment is capable of giving an output data sequence of a characteristic close to the original analog signal without shifting it in one direction in the same manner as in the preceding embodiment. The fraction raising and discarding actions may be arranged to be conversely performed by replacing the NOR gate 36 with an OR gate. Further, the logical circuit may be changed to determine the levels of data relative to an arbitrary predetermined value and to decide whether the fraction of the output is to be raised or discarded, accordingly.

Figure 5:
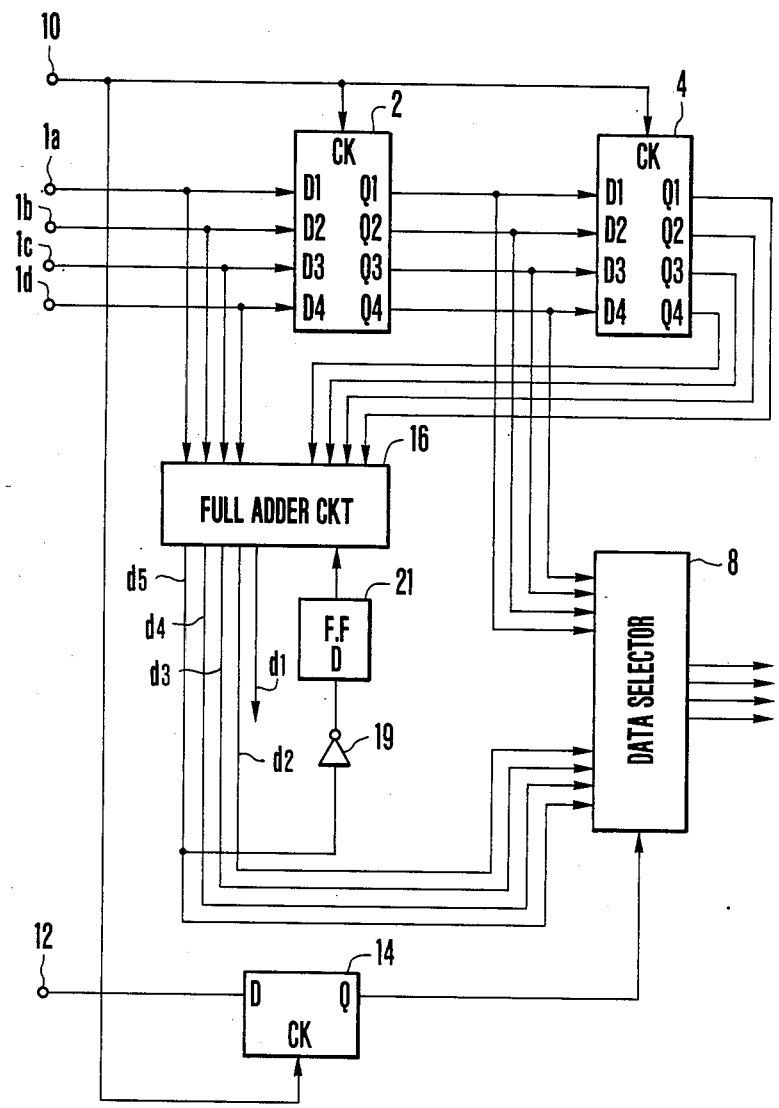
FIG. 5 is a block diagram showing the arrangement of essential parts of a data processing device arranged as a further embodiment of this invention.

FIG. 5 shows the arrangement of essential parts of a data processing device arranged as a further embodiment of the invention. In FIG. 5, the same component elements as those shown in FIG. 2 are indicated by the same reference numerals. The operation of the various parts of this embodiment is described as follows with a specific input data applied thereto by way of example: The input data is obtained by sampling an analog signal (an audio signal, for example) which has portions thereof produces at about the same rate on both sides of the 0 level. The input data is linearly quantized in four bits arranged in 16 steps from −8 through +7. In other words, a decimal data of −8 becomes 0000 (2), a data of 0 becomes 1000 (2) and a data of +7 becomes 1111 (2). The input data is received in time series at a certain timing in the order of data A, data B and data C. Of these data, the data B is assumed to be incorrect and to be replaced with an interpolation data in the following description:

TABLE 1

| Examples of input and output data | | | | |
|---|---|---|---|---|
| Data A - binary (2): | 1101 | 1101 | 1001 | 1001 |
| decimal: | +5 | +5 | +1 | +1 |
| Data C - binary (2): | 1010 | 1001 | 0100 | 0101 |
| decimal: | +2 | +1 | −4 | −3 |
| Full adder output (2): | 10111 | 10110 | 01101 | 01110 |
| Carry-in: | 0 | 0 | 1 | 1 |
| Interpolation data - binary (2): | 1011 | 1011 | 0111 | 0111 |
| decimal: | +3 | +3 | −1 | −1 |

Table 1 above shows some examples of the input and output data. Referring to Table 1, let us assume that the data A is of a value 1101 (2) which corresponds to a decimal value of +5; and the data C is of a value 1010 (2) which corresponds to a decimal value of +2. When the data A is supplied to the latching circuit 2 while the data C is being produced from the latching circuit 4, the output of the full adder circuit 16 becomes 10111 (2). Since the most significant bit (MSB) of this data is "1", the output of the inverter 19 becomes "0". Then, the carry-in, which is the output of a D flip-flop 21, is at "0" and is not added. If a data consisting of higher four bits is taken out from the output of the full adder circuit 16, a shift is effected by one bit and an average value interpolation data of a value 1011 (2) is obtained from the data A and C. Then, the least significant bit (hereinafter referred to as LSB) of the output of the full adder circuit 16 is discarded. In other words, considering this in an analog manner, the actual interpolation data is +3 while the average value interpolation data is $$+3.5 \left( = \frac{2+5}{2} \right).$$

In case that the data A is +5 corresponding to 1101 (2) and the data C is +1 corresponding to 1001 (2), the output of the full adder circuit 16 becomes 10110 (2) and the carry-in is at "0". In this case, the interpolation data becomes 1011 (2). Considering this in an analog manner, the interpolation data is $$+3 \left( = \frac{1+5}{2} \right).$$

In this case, therefore, no fraction is raised nor discarded.

If the data A is +1 and the data C −4, the output of the full adder circuit 16 is 01101 (2) as shown in Table 1. In this case, however, the carry-in becomes "1" to make the output of the full adder circuit 01110 (2). This causes the interpolation data to become 0111 (2). Considering it in the analog manner, the interpolation data is −1 while the average value of the data A and C is $$-1.5 \left( = \frac{1-4}{2} \right).$$

In this case, therefore the least significant bit (LSB) is discarded. Whereas, if the data A is +1 and the data C −3, the LSB of the output is "0". In that event, the output of the circuit 16 merely has its LSB changed to "1" even if the carry-in becomes "1". Therefore, the data of upper four bits of the output remains unchanged and the fraction is not raised nor discarded.

In accordance with the arrangement described above, the fraction can be raised when the MSB of the output of the full adder circuit 16 is "1" and can be discarded when it is "0". In other words, the output is rounded up when the average value of the data A and C is larger than 0 and is rounded off when the average value is smaller than 0. Whether the average value is larger or smaller than 0 is discriminated by the MSB of the output. According to the arrangement of this embodiment, therefore, the interpolation data is always rounded off when it is of a positive value and rounded up when it is negative. In either case, the interpolation data is shifted toward the 0 level. Therefore, the output data of the embodiment is never shifted in one direction to ensure that it is always close to a proper information signal.

Figure 6:
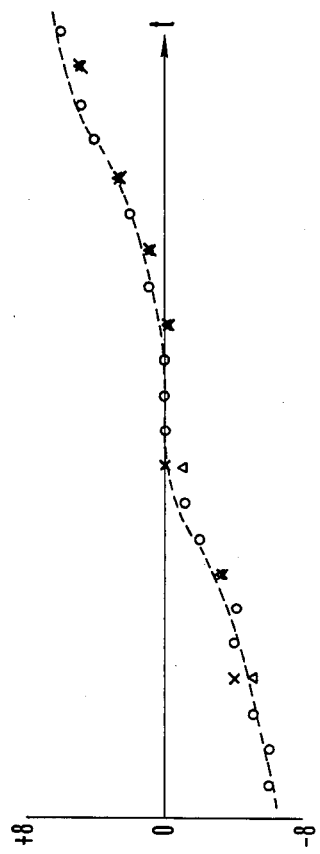
FIG. 6 is a graph showing the effects attainable by the device shown in FIG. 5.

FIG. 6 shows this. The original analog information signal is depicted by a broken line with correct data indicated by marks "o". The interpolation data obtained by the prior art device shown in FIG. 1 are indicated by marks "Δ" while the interpolation data obtained by the embodiment shown in FIG. 5 are indicated by marks "x". The drawing clearly shows that the data obtained by the prior art device of FIG. 1 tend to be shifted downward. The device arranged according to this invention as shown in FIG. 5 eliminates the downward tendency.

The embodiment of course can be modified to effect rounding up instead of rounding off when the MSB of the output of the full adder circuit 16 is at "1" and to effect rounding off instead of rounding up when the MSB is at "0". This modification likewise gives the advantageous effect of preventing the signal from being shifted in one direction. For this modification, the MSB of the output of the full adder circuit 16 is arranged to become the carry-in of the full adder circuit 16 as it is. The arrangement of this modification is especially advantageous in cases where the original analog information signal is of a sinusoidal waveform, because: Generally, an original analog signal which has a sinusoidal waveform with reference to a predetermined value tends to expand upward at a value above the predetermined value and downward at a value below the predetermined value. Therefore, with the arrangement of the modification applied to such a signal, an interpolation data closer to the original analog information signal can be obtained as the data is rounded up when the result of computation is above the predetermined value and rounded off when it is below the predetermined value.

Figure 7:
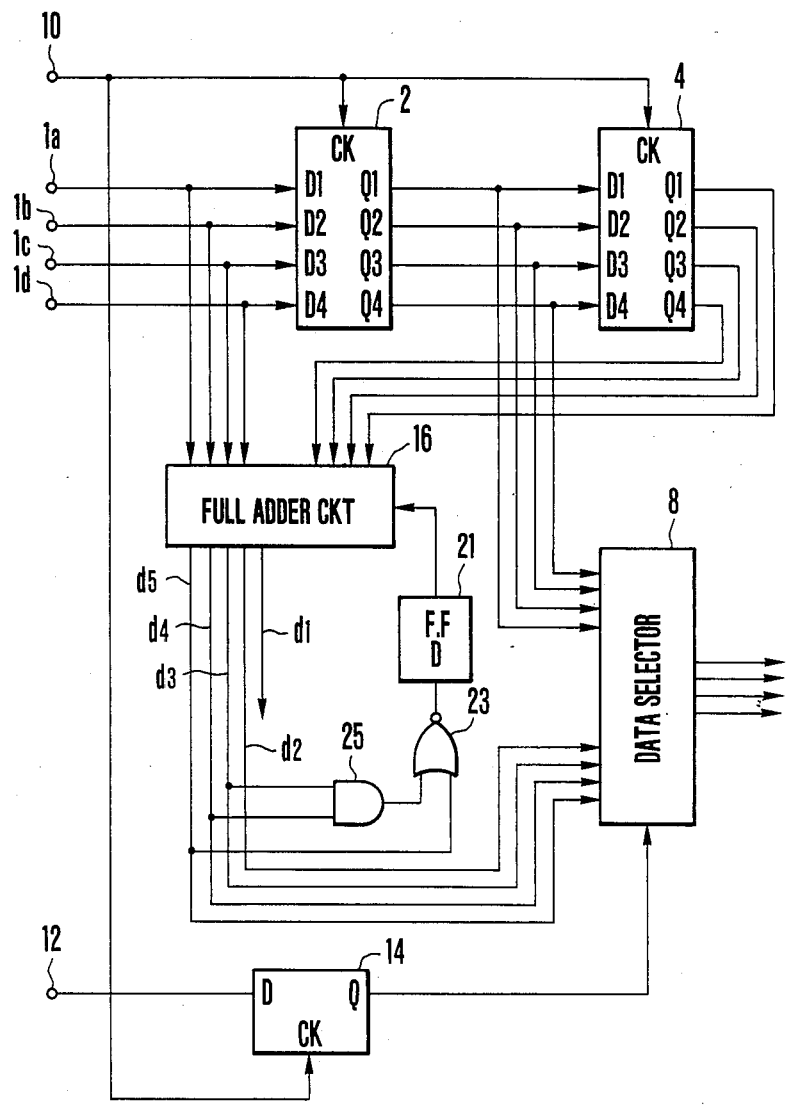
FIG. 7 is a block diagram showing the arrangement of essential parts of a data processing device arranged as a further embodiment of the invention.

FIG. 7 shows the arrangement of essential parts of another data processing device arranged also according to this invention. The components of this device which are similar to those shown in FIG. 5 are indicated by the same reference numerals and the details of them are omitted from the following description. This device is provided with a NOR gate 23 and an AND gate 25. In this case, there is no carry-in when the output of the full adder circuit 16 is above 01100 (2) and there is a carry-in to permit only a rounding up action when it is below 01011 (2). The device is thus arranged to determine whether the result of the average value computation is larger or smaller than −2 as considered in the analog manner and to decide whether it is to be rounded up or rounded off, accordingly. This arrangement of the embodiment is naturally applicable to the case where a data processing operation is to be carried out on a data sequence obtained by sampling an analog information signal which includes data of values larger and smaller than −2 at about the same rate. The device is also capable of giving a data sequence close to the original analog information signal without shifting the original signal in a one-sided direction. The rounding up and rounding off actions of the device of course can be conversely arranged by just replacing the NOR gate 21 with an OR gate. Further, it is of course possible to modify the logic circuit in such a way as to permit discrimination as to largeness and smallness in reference to an arbitrarily set value and to decide rounding up or rounding off, accordingly.

Figure 8:
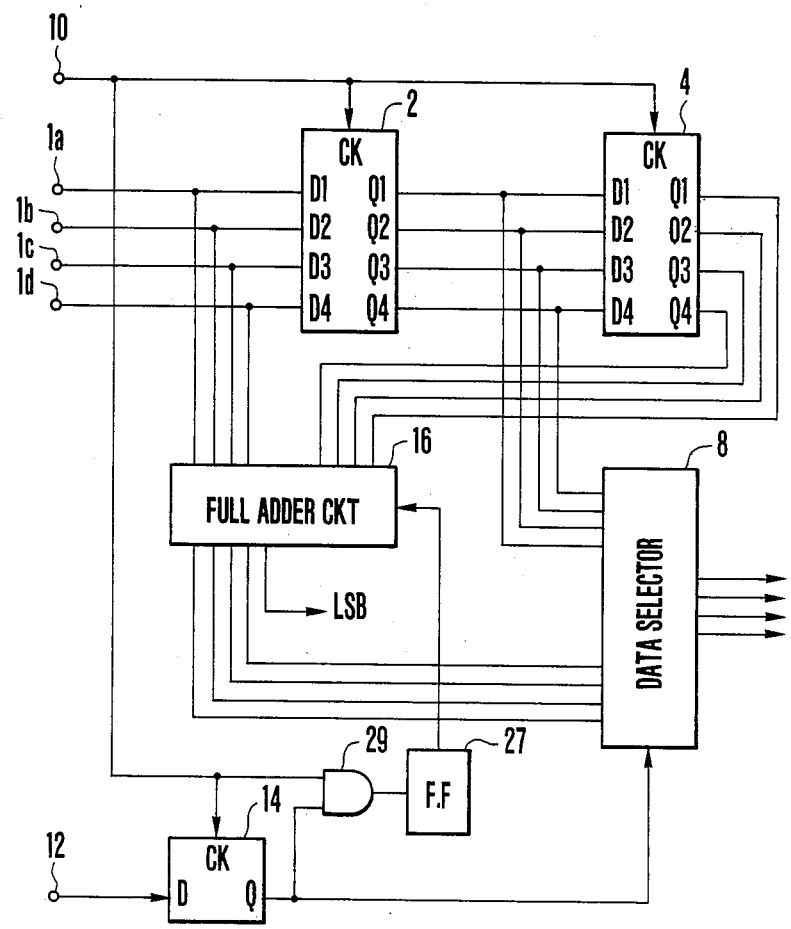
FIG. 8 is a block diagram showing the arrangement of essential parts of a data processing device arranged as a further embodiment of this invention.

FIG. 8 shows the arrangement of essential parts of a data processing device arranged as further embodiment of this invention. In FIG. 8, the same components as those of the device of FIG. 2 are indicated by the same reference numerals and the details of them are omitted from the following description. The device is provided with an AND gate 29 and a flip-flop 27 (hereinafter referred to as FF). The output of the FF 27 is used as the carry-in to the full adder circuit 16.

Figure 9:
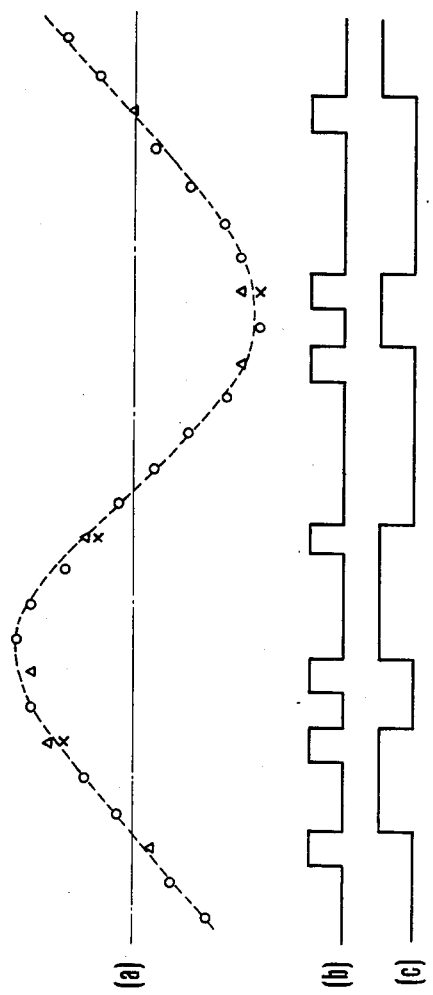
FIG. 9 is a timing chart showing the waveforms of outputs produced from the various parts of the embodiment shown in FIG. 8.

FIG. 9 is a timing chart showing the waveforms of the outputs of various parts of FIG. 8. The following description describes with reference to FIG. 9 the arrangement and operations of the various parts: This embodiment is supposed to receive an input data sequence obtained by sampling an analog information signal (an audio signal, for example) which is generated about equally on both the positive and negative sides of the 0 level. The input data sequence is linearly quantized in four bits and arranged in 16 steps from −8 to +7. In other words, a decimal data of −8 corresponds to 0000 (2), a decimal data of 0 to 1000 (2) and a decimal data of +7 to 1111 (2).

Again referring to FIG. 9, a part (b) of the drawing shows the output of the latching circuit 14. When this output is at "1", the output data of the latching circuit 2 is an incorrect data. Further, with the output (b) of the latching circuit 14 at "1", the data selector 8 produces a data consisting of the higher four bits of the output of the full adder circuit 16. The AND gate 29 produces a pulse signal every time the latching circuit 2 produces an incorrect data. The output of the FF 27 is inverted every time the AND gate 29 produces the pulse signal. Since the output of the FF 27, which is shown at a part (c) of FIG. 9, becomes the carry-in for the full adder circuit 16, the carry-in of the full adder circuit 16 shifts between "1" and "0" every time the latching circuit 2 produces an incorrect data.

When, for example, the full adder circuit 16 has inputs of 1011 (2) or +3 and 0110 (2) or −2, the output of the circuit 16 becomes 10001 (2) with the carry-in at "0" and becomes 10010 (2) with the carry-in at "1". Accordingly, the data supplied to the data selector 8 either becomes 1000 (2) or 0 or becomes 1001 (2) or +1. In the event that a fraction results thus from the computing operation of the full adder circuit 16 on the two inputs, that is, when the LSB of the output data of the circuit 16 is at "1", the full adder circuit 16 serves as an average value computing circuit which either raises the fraction or discards the fraction according to the carry-in thereof.

According to the arrangement described above, an interpolation data, which is obtained by rounding up the average value of the data immediately before and after an incorrect data, and another interpolation data, which is obtained by rounding off the average value, are generated at about equal rates. As a result of the arrangement, the output data of the device never one-sidedly deviates from a proper information signal as shown at a part (a) of FIG. 9. In the part (a) of FIG. 9, a broken line depicts the original analog information signal; marks "o" indicates correct data; while marks "Δ" indicate interpolation data.

FIG. 10 shows a data processing device which is arranged as a further embodiment of this invention. In FIG. 10, the components of the device similar to those shown in FIG. 8 are indicated by the same reference numerals and the details of them are omitted from the following description. In this case, the output of the FF 27 is inverted by timing clock pulses for every data. The carryin of the full adder circuit 16 is thus shifted between "1" and "0". Therefore, this embodiment likewise produces an interpolation data obtained by rounding up the average value of data located immediately before and after an incorrect data and another interpolation data obtained by rounding off the average value at about equal rates. The embodiment thus gives the same advantageous effect as the embodiment shown in FIG. 8.

Figure 11:
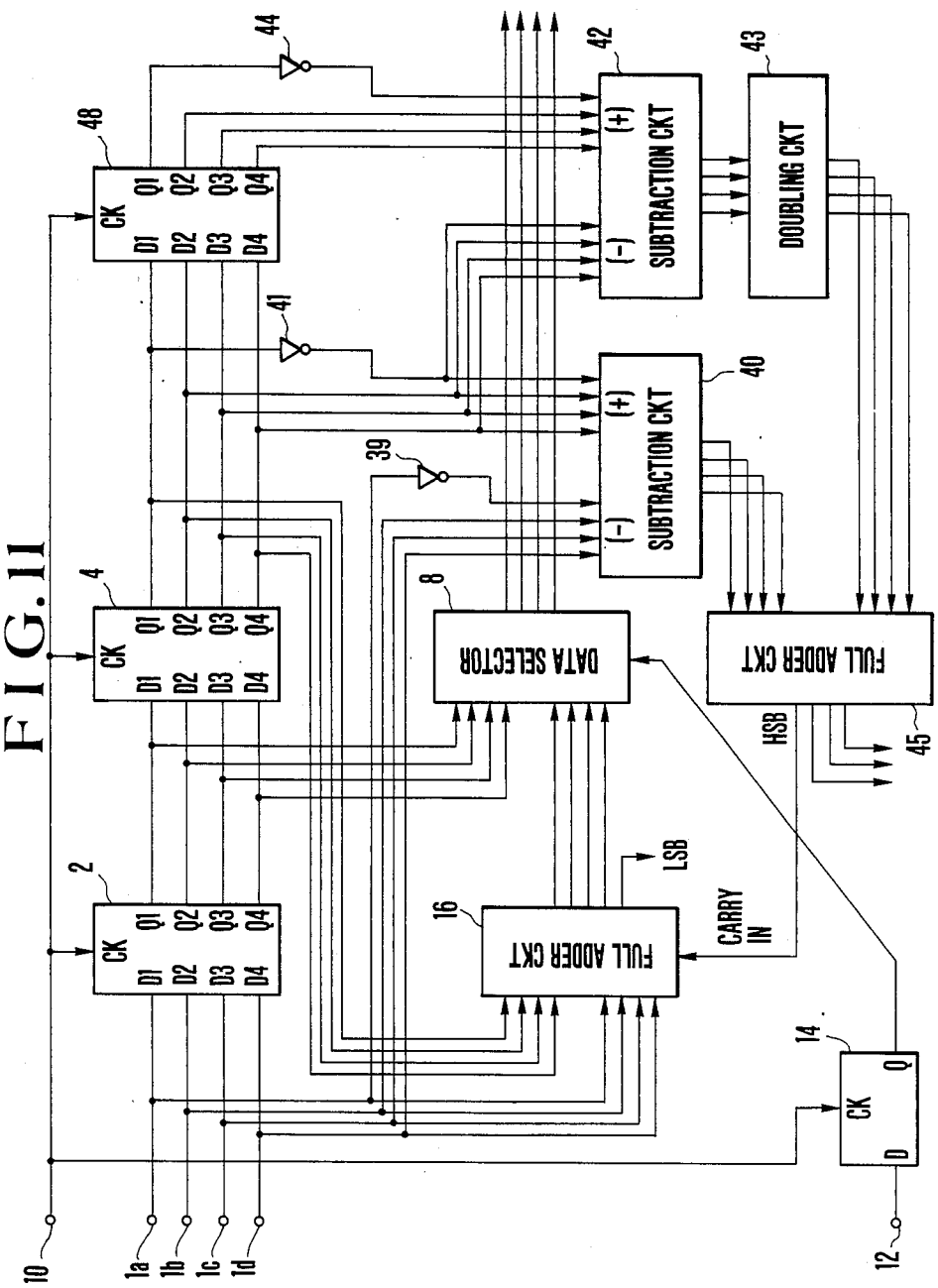
FIG. 11 is a block diagram showing the arrangement of essential parts of a data processing device arranged as a further embodiment of the invention.

FIG. 11 shows a still further embodiment of this invention. In FIG. 11, the same components as those shown in FIG. 2 are indicated by the same reference numerals and the details of them are omitted from the following description. The embodiment is provided with a latching circuit 48, which is arranged to produce the output of the latching circuit 4 by further delaying it by another sampling period; subtraction circuits 40 and 42; a doubling circuit 43, which produces an output by doubling an input data received; a full adder circuit 45; and inverters 39, 41 and 44.

Figure 12A:
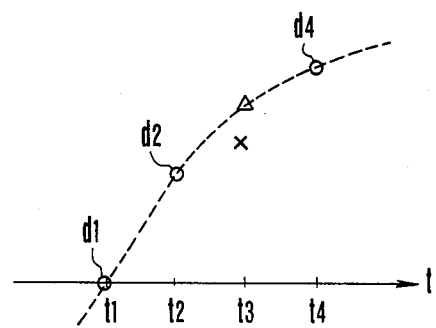
FIGS. 12(A) and 12(B) are graphs showing the data replacing operation of the embodiment shown in FIG. 11.
Figure 12B:
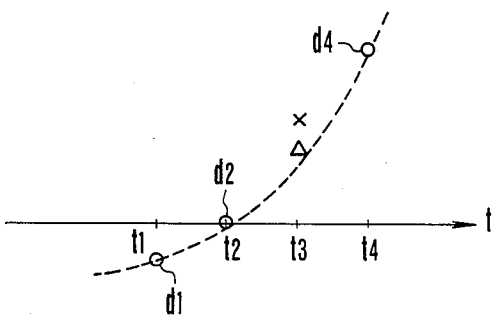

Before describing the operation of the embodiment arranged as described above, the operating principle of it is briefly described as follows: Referring to FIGS. 12(A) and 12(B) which show the operating principle, original analog information signals are shown in broken lines. Marks "o" indicate correct data. Marks "Δ" and "x" indicate interpolation data. Symbols t1, t2, t3 and t4 indicate timing for sampling. An incorrect data is assumed to be received at the time point t3. In the event of the original analog information signal, which is curving upward at the point of time t3, as shown in FIG. 12(A), that is, when the quadratic differential value is negative, the original analog information signal is at a relatively high level. In this event, the fraction of the result of computation is preferably raised in obtaining an interpolation data. In case that the original analog information signal is curving downward at the point of time t3, as shown in FIG. 12(B), on the other hand, the fraction of the result of computation is preferably discarded in obtaining an interpolation data.

In one method for discriminating whether the quadratic differential value is positive or negative, the purpose is attained as follows: Let us assume that the data values at the points of time t1, t2 and t4 are d1, d2 and d4, respectively. When the quadratic differential value is positive, the gradient of the signal increases with the lapse of time. Therefore, an average gradient between the points of time t1 and t2 and an average gradient between the points of time t2 and t4 are compared. In other words, (d2−d1)/T (T representing one sampling period) is compared with (d4+d2)/2T. The signal curves downward when the value of (d4−d2)+2(d1−d2) is positive and upward when it is negative. Further, in case where the data d5 obtained at a point of time t5 which is later than the point of time t4 by one period T, either a value of 2(d5−d4)+(d2−d4) or a value of (d5−d4)+(d1−d2) is determined whether it is positive or negative.

The following describes the operation of each part of the embodiment shown in FIG. 11 with a specific data sequence assumed to be processed: In this embodiment, the data supplied to the terminals 1a-1d are assumed to have been obtained by sampling an analog signal (an audio signal, for example) which is generated at about the same amplitude and about the same rate on both the positive and negative sides of the 0 level thereof. The signal is assumed to be linearly quantized in four bits and arranged in 16 steps from −8 to +7. In other words, a decimal value data of −8 of the signal corresponds to 0000 (2), a decimal value data of 0 to 1000 (2) and a decimal value data of +7 to 1111 (2), respectively.

Again referring to FIG. 12(A), let us assume that the data d1 is of a value 1000 (2) or 0, the data d2 is 1011 (2) or +3 and another data d4 is 1110 (2) or +6. In this instance, when the data d1 is supplied to the input terminals 1a-1d, the data d2 is produced from the latching circuit 2 and the data d4 from the latching circuit 48. At that time, the output of the latching circuit 14 is at a high level. Therefore, the data selector 8 produces the higher four bits of the output of the full adder circuit 16. In other words, the selector 8 produces a data of (d2+d4)/2.

The subtraction circuit 40 is arranged to have the data d4 as a positive input and the data d2 as a negative input thereof. The inverters 39 and 41 are arranged to invert the MSB's of these data d4 and d2 before they are supplied to the circuit 40. This is because the subtracting operation of the subtraction circuit 40 is to be carried out with two's complementary data. The inverters 39, 41 and 44 serve to convert data obtained by an offset binary process into data obtained by a two's complementing process. Therefore, the data d1, d2 and d4 supplied to the subtraction circuits 40 and 42, respectively, become 0000 (2), 0011 (2) and 0110 (2). As a result of this, the output data (d4−d2) of the subtraction circuit 40 becomes 0011 (2) or −3 and the output data (d1−d2) of the subtraction circuit 42 becomes 1101 (2). The output data (d1−d2) of the subtraction circuit 42 is doubled by the doubling circuit 43 into 1010 (2) and is added together with the output data 0011 (2) of the subtraction circuit 40 at the full adder circuit 45. The full adder circuit 45 then produces a data of 1101 (2). The output of the full adder circuit 45 is (d4−d2)+2(d1−d2) and the upward or downward curve of the signal (the quadratic differential characteristic of the signal) can be determined by discriminating this data as to whether it is positive or negative as mentioned in the foregoing. The data obtained through the two's complementing process is negative when the MSB thereof is at "1" and is positive when the MSB is at "0". Since the MSB is at "1", in this instance, the value of (d2+d4)/2 is rounded up.

The full adder circuit 16 adds up the data d2 (1011 (2)) and d4 (1110 (2)) which are obtained by an offset binary process. However, the MSB of the above-stated output of the other full adder circuit 45 which is at "1" is supplied to the full adder circuit 16 as a carry-in. Therefore, the output of the full adder circuit 16 becomes 11010 (2). Accordingly, an average value data, obtained by taking the higher four bits of the output, becomes 1101 (2) or +5 with the fraction of the output raised. The output of the device obtained from this data becomes as indicated by the mark "Δ" in FIG. 12(A) and is very close to the waveform of the original analog information signal. The mark "x" of FIG. 12(A) indicates a data which is an output of the device obtained by discarding the fraction mentioned above.

Referring now to FIG. 12(B), the data d1 is assumed to be 0111 (2) or −1, the data d2 to be 1000 (2) or 0 and the data d4 to be 1101 (2) or +5. In this instance, the output of the subtraction circuit 40 becomes 0101 (2) which is obtained through a two's complementing process. The output of the subtraction circuit 42 becomes 1111 (2) and the output of the doubling circuit 43 becomes 1110 (2), while the output of the full adder circuit 45 is 0011 (2). Since the MSB of the output of the full adder circuit 45 is "0", the carry-in of the full adder circuit 16 becomes "0". At the full adder circuit 16, the data d4, which is 1101 (2) and is obtained through an offset binary process, and the data d2, which is 1000 (2), are added together. The output of the circuit 16 thus becomes 10101 (2). Then, since a data of +2 is obtained from the higher four bits 1010 (2) of this output, the fraction of the output is thus discarded. As indicated by the mark "Δ" in FIG. 12(B), this output data is much closer to the waveform of the original analog information signal than an output data which is obtained by raising the fraction and is indicated by the mark "x" in FIG. 12(B).

The embodiment which is arranged as shown in FIG. 11, thus raises or discards the fraction of the result of computation of the average value circuit according to the quadratic differential characteristic of the original analog information signal as described in the foregoing. In the event of coarse quantization, therefore, the error of the output data of the embodiment from the original signal is never increased by rounding up or rounding off of the data, but is rather decreased by the arrangement.

Figure 13:
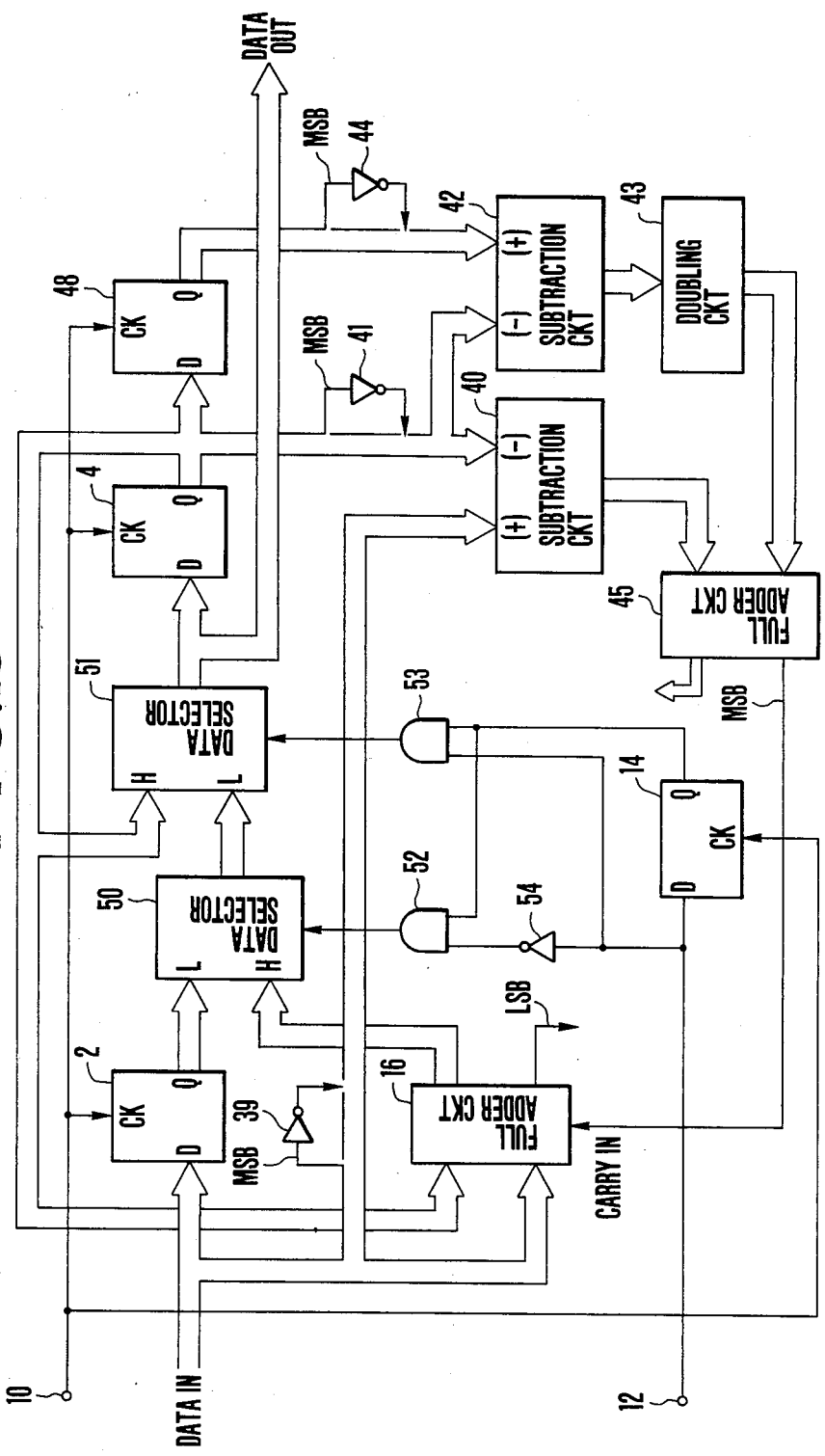
FIG. 13 is a block diagram showing the arrangement of essential parts of a data processing device arranged as a still further embodiment of the invention.
Figure 14:
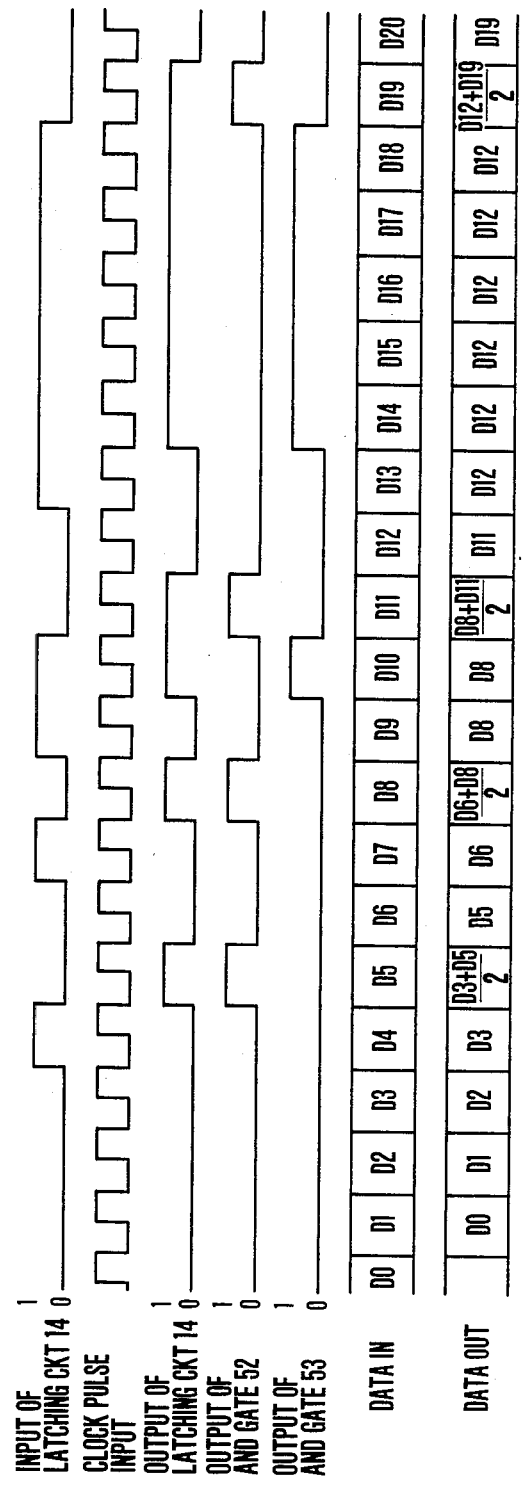
FIG. 14 is a timing chart showing the waveforms of outputs from the various parts of the embodiment shown in FIG. 13.

The following describes a case where two or more incorrect data consecutively arise: FIG. 13 shows the arrangement of essential parts of a data processing device arranged as another embodiment of the invention which is applicable to such a case. In FIG. 13, the components similar to those shown in FIG. 11 are indicated by the same reference numerals and the details of them are omitted from the following description. The device is provided with an inverter 54; AND gates 52 and 53; and data selectors 50 and 51. FIG. 14 is a timing chart showing the operations of the various parts of FIG. 13. The operation of the embodiment is described below with reference to FIG. 14:

A part DATA IN of FIG. 13 is arranged to receive data D0, D1, D2, --- D19 and D20 as shown in the part DATA IN of FIG. 14. When an error detection signal, which is supplied from the input terminal 12 to the latching circuit 14, is at "1", the data supplied from the part DATA IN is incorrect. In the case of the illustration given in FIG. 14, the data D4, D7, D9, D10 and D13–D18 are incorrect, respectively. When the output of the latching circuit 14 is at "0", the data produced from the latching circuit 2 is correct. At this instance, the outputs of the AND gates 52 and 53 are at a low level and the data selectors 50 and 51 select data supplied to their terminals L and produce these selected data. Then, the output of the latching circuit 14 is produced from a part DATA OUT as it is and, is also supplied to the latching circuit 4 under that condition.

In case that the output of the latching circuit 14 is at "1", the output data of the latching circuit 2 is incorrect. In this case, the output data cannot be produced via the data selectors 50 and 51 from the part DATA OUT as it is. The output data must be replaced with some interpolation data. The incorrect data is to be replaced either with a correct data most recently generated before it (by a pre-holding process) or with a data representing an average value of the latest correct data and a data generated immediately following the incorrect output data (by an average value interpolating process). The selection between these two different replacing processes is determined by the correctness of the data generated immediately following the data in question. If the immediately following data is correct, the average value interpolating process is selected. In that case, the incorrect data is replaced with a data obtained from the higher four bits of the data produced from the full adder circuit 16 in the above-stated manner. In this instance, the level of the output of the AND gate 52 becomes high. The data selector 50 produces a data which consists of the higher four bits of the output of the full adder circuit 16 and is supplied to the input terminal H of the data selector 50. The output data of the data selector 50 is then produced to the part DATA OUT via the terminal L of the other data selector 51. In FIG. 14, the parts where the data D4 is replaced by a data of (D3+D5)/2 and the data D7 by a data of (D6+D8)/2 represent this process.

Meanwhile, in the event that the immediately following data is also incorrect, the average value interpolating process is not applicable. In that event, therefore, a data, which has been produced immediately before, is again produced. Then, the output level of the AND gate 53 becomes high. The data selector 51 comes to produce a data which has been produced immediately before and has been delayed by one sampling period by the latching circuit 4. This output data of the data selector 51 is supplied to the part DATA OUT and also again supplied to the latching circuit 4. The parts of FIG. 14 where the data D9 is replaced with the data D8 and where the data 13–17 are replaced with a data D12 represent this pre-holding process.

Further, with a number of incorrect data coming in succession, when the last one is produced from the latching circuit 2, the output of the AND gate 52 is at a high level while that of the AND gate 53 is at a low level. Therefore, a data, consisting of the higher four bits of the output of the full adder circuit 16, is supplied to the part DATA OUT. This full adder circuit 16 is arranged such that a data, representing an average value of the latest correct data (or a pre-holding data) produced from the latching circuit 4 and a correct data supplied to the part DATA IN, is produced from the part DATA OUT. This process is represented by parts where the data D10 is replaced with a data of (D8+D11)/2 and the data D18 with a data of (D12+D19)/2.

Further, the output data of the full adder circuit 45 shows the quadratic differential characteristic of the original analog signal. The analog signal is curving downward when this output data is positive and upward when the data is negative. Since the output of the full adder circuit 45 is a data obtained by a two's complementing process, the result of the average value computation is likewise rounded up or off with the MSB of the output of the full adder circuit 45 supplied to the full adder circuit 16.

The arrangement of the embodiment described above also gives a data close to the original analog information signal even in the event of coarse quantization.

While offset binary data of four bits are used in the foregoing description, the applicability of this invention is not limited by the kind and number of quantization of the data to be processed. While average value computation alone has been described as computing means for obtaining an interpolation data, this invention is applicable to a case where the result of computation is to be rounded up or rounded off by a tertiary interpolation method. The invention is also of course applicable to an interpolation process to be carried out when two or more incorrect data consecutively occur.

What is claimed is:
1. A data processing device, comprising:
(a) input means for inputting a data sequence consisting of a number of binary data of n bits obtained by sampling an information signal, n being an integer more than 2;
(b) computing means connected to said input means for computing a plurality of binary data included in said data sequence for providing an interpolation data;
(c) rounding means connected to said computing means for raising a fraction which is arranged below a predetermined bit of said interpolation data as a unit one bit above said predetermined bit or cutting away the same thus producing rounded interpolation data;
(d) replace means connected to said input means and said rounding means for replacing an incorrect binary data included in said data sequence with said rounded interpolation data; and
(e) control means for controlling said rounding means so that said raising the fraction to a unit and said cutting away the fraction to a unit by said rounding means are performed alternately every time said replace means replaces said incorrect binary data with said rounded interpolation data.

2. A data processing device, comprising:
(a) input means for inputting a data sequence consisting of a number of binary data of n bits obtained by sampling an information signal, n being an integer more than 2;
(b) computing means connected to said input means for computing a plurality of binary data included in said data sequence for providing an interpolation data;
(c) rounding means connected to said computing means for raising a fraction which is arranged below a predetermined bit of said interpolation data as a unit one bit above said predetermined bit or cutting away the same thus producing rounded interpolation data;
(d) replace means connected to said input means and said rounding means for replacing an incorrect binary data included in said data sequence with said rounded interpolation data; and (e) control means for controlling said rounding means so that said raising the fraction to a unit and said cutting away the fraction to a unit by said rounding means are performed alternately every time said input means inputs said binary data of n bits.

3. A data processing device, comprising:
(a) input means for inputting a data sequence consisting of a number of binary data of n bits obtained by sampling an information signal, n being an integer more than 2;
(b) computing means connected to said input means for computing a plurality of binary data included in said data sequence for providing an interpolation data;
(c) rounding means connected to said computing means for raising a fraction which is arranged below a predetermined bit of said interpolation data as a unit one bit above said predetermined bit or cutting away the same thus producing rounded interpolation data;
(d) replace means connected to said input means and said rounding means for replacing an incorrect binary data included in said data sequence with said rounded interpolation data;
(e) comparison means for comparing said interpolation data and a predetermined data corresponding to said information signal of a predetermined level to generate a comparison data of one bit; and
(f) control means for controlling which one of said raise to a unit or said cutting away to a unit of the fraction by said rounding means is to be done based on said comparison data.

4. A device according to claim 3, wherein said data sequence includes data corresponding to said information signal above said predetermined level, and data corresponding to said information signal below said predetermined level in approximately a same ratio.

5. A device according to claim 4, wherein said predetermined level is a ground level.

6. A data processing device, comprising:
(a) input means for inputting a data sequence consisting of a number of binary data of n bits obtained by sampling an information signal, n being an integer more than 2;
(b) computing means connected to said input means for computing a plurality of binary data included in said data sequence for providing an interpolation data;
(c) rounding means connected to said computing means for raising a fraction which is arranged below a predetermined bit of said interpolation data as a unit one bit above said predetermined bit or cutting away the same thus producing rounded interpolation data;
(d) replace means connected to said input means and said rounding means for replacing an incorrect binary data included in said data sequence with said rounded interpolation data;
(e) comparison means for comparing said binary data inputted by said input means and a predetermined data corresponding to said information signal of a predetermined level to generate a comparison data of one bit; and
(f) control means for controlling which one of said raising to a unit or said cutting away to a unit of the fraction by said rounding means is to be performed based on said comparison data.

7. A device according to claim 6, wherein said control means controls said rounding means by using a plurality of said comparison data corresponding to a plurality of said binary data inputted by said input means.

8. A device according to claim 7, wherein said control means includes discriminating means for discriminating whether or not a number of binary data greater than said predetermined data is larger than that of binary data less than said predetermined data in said plurality of said binary data by using said plurality of said comparison data.

9. A device according to claim 6, wherein said data sequence includes data corresponding to said information signal above said predetermined level, and data corresponding to said information signal below said predetermined level in approximately a same ratio.

10. A device according to claim 9, wherein said predetermined level is a ground level.

11. A data processing device, comprising:
(a) input means for inputting a data sequence consisting of a number of binary data of n bits obtained by sampling an information signal, n being an integer more than 2;
(b) computing means connected to said input means for computing a plurality of binary data included in said data sequence for providing an interpolation data;
(c) rounding means connected to said computing means for raising a fraction which is arranged below a predetermined bit of said interpolation data as a unit one bit above said predetermined bit or cutting away the same thus producing rounded interpolation data;
(d) replace means connected to said input means and said rounding means for replacing an incorrect binary data included in said data sequence with said rounded interpolation data;
(e) discrimination means for discriminating a quadratic differential characteristic of a part of said information signal corresponding to said incorrect binary data to generate a discrimination data of one bit; and
(f) control means for controlling which one of said raising to a unit or said cutting away to a unit of the fraction by said rounding means is to be performed based on said discrimination data.

* * * * *